United States Patent
Lei et al.

(10) Patent No.: US 10,735,799 B2
(45) Date of Patent: Aug. 4, 2020

(54) MEDIA PLAYER OPERATING IN MULTIPLE MODES

(71) Applicant: HULU, LLC, Santa Monica, CA (US)

(72) Inventors: Bao Lei, Santa Monica, CA (US); Ilya Haykinson, Santa Monica, CA (US); Rajiv Naresh Makhijani, Saratoga, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/993,273

(22) Filed: May 30, 2018

(65) Prior Publication Data
US 2018/0278981 A1    Sep. 27, 2018

Related U.S. Application Data

(63) Continuation of application No. 14/294,423, filed on Jun. 3, 2014, now Pat. No. 9,998,781.

(60) Provisional application No. 61/831,530, filed on Jun. 5, 2013.

(51) Int. Cl.
| H04N 21/4143 | (2011.01) |
| G06F 3/0485 | (2013.01) |
| G06F 3/0484 | (2013.01) |
| H04N 21/443 | (2011.01) |
| H04N 21/472 | (2011.01) |

(52) U.S. Cl.
CPC ....... *H04N 21/4143* (2013.01); *G06F 3/0484* (2013.01); *G06F 3/0485* (2013.01); *H04N 21/4438* (2013.01); *H04N 21/472* (2013.01)

(58) Field of Classification Search
CPC .. G06F 3/0484; G06F 3/0485; H04N 21/4143
See application file for complete search history.

(56) References Cited

U.S. PATENT DOCUMENTS

| 7,373,650 | B1 | 5/2008 | Rodriguez et al. |
| 8,631,356 | B2 | 1/2014 | Lai et al. |
| 9,998,781 | B2 | 6/2018 | Lei et al. |
| 2007/0003224 | A1 | 1/2007 | Krikorian et al. |
| 2009/0049385 | A1* | 2/2009 | Blinnikka ............. G06F 3/0481 715/719 |
| 2009/0063699 | A1* | 3/2009 | Chapweske ........ H04N 7/17318 709/233 |
| 2011/0176790 | A1 | 7/2011 | Morris |
| 2014/0123011 | A1 | 5/2014 | Ahuja et al. |
| 2014/0208268 | A1 | 7/2014 | Jimenez |
| 2014/0344055 | A1 | 11/2014 | Sanghavi et al. |

* cited by examiner

*Primary Examiner* — William L Bashore
*Assistant Examiner* — Gregory A Distefano
(74) *Attorney, Agent, or Firm* — Fountainhead Law Group, PC (57) ABSTRACT

In one embodiment, a method plays, a media program in a media player operating in a first mode on an interface. A change in a condition is detected for the media player. Then, the method switches from the first mode to a second mode based on the change in the condition. The second mode restricts movement of the media player. The media player is moved from a first position to a second position upon switching to the second mode and the media player continues to play the media program in the second position.

20 Claims, 9 Drawing Sheets

MEDIA PLAYER OPERATING IN MULTIPLE MODES

CROSS-REFERENCES TO RELATED APPLICATIONS

This application is a continuation of U.S. patent application Ser. No. 14/294,423 filed Jun. 3, 2014 entitled "Media Player Operating in Multiple Modes", now U.S. Pat. No. 9,998,781 B2, which claims priority to U.S. Provisional Patent Application No. 61/831,530 filed Jun. 5, 2013 entitled "Media Player Operating in Multiple Modes", all of which are incorporated by reference in its entirety for all purposes.

BACKGROUND

Sending video to an application is a popular way to view video content. A user typically plays a video in a media player displayed in an application or a web page. In one case, the video player may be a full-screen version that takes up the whole screen of the interface. In another case, a user may use a smaller version of the media player that is embedded in a page of the application.

When a user uses the full-screen version, the user cannot perform any other actions on the page, such as scroll the page to a different position. If the user does want to perform any other actions, the user typically has to exit or minimize (e.g., go to an embedded version) the media player. This allows the user to navigate the page to view other content. However, exiting the media player may stop the playing of the video.

When the media player is minimized or when the user uses the embedded version of the media player, the user may perform other actions while watching the video. For example, a user may navigate to different parts of the page by scrolling the page horizontally or vertically. However, when scrolling the page, the embedded media player also moves, and may move to an undesirable position in the interface.

DETAILED DESCRIPTION

Described herein are techniques for operating a media player in different modes. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Overview

Particular embodiments provide a media player that switches between modes automatically. In one example, a page includes trays that can be individually moved by a user. The trays may include embedded media players that a user can use to play a media program in-line (e.g., in the tray). The trays allow a user to move various parts of the page while the media program plays in one of the trays. For example, a user may scroll the tray playing the media program horizontally or scroll other trays. Also, the user may scroll the entire page vertically to move all the trays at once. Because this movement is allowed while playing the media program, a user may scroll the media player in the tray to an out of bounds position (e.g., off-screen or partially off-screen). When this occurs, particular embodiments may transition the media player to a different operating mode. In the transition, the media player is also moved to a different position in the interface. For example, particular embodiments may transfer the media player to a docked media player (e.g., a stationary media player) in a different position on the page, such as on the bottom of the page.

Figure 1:
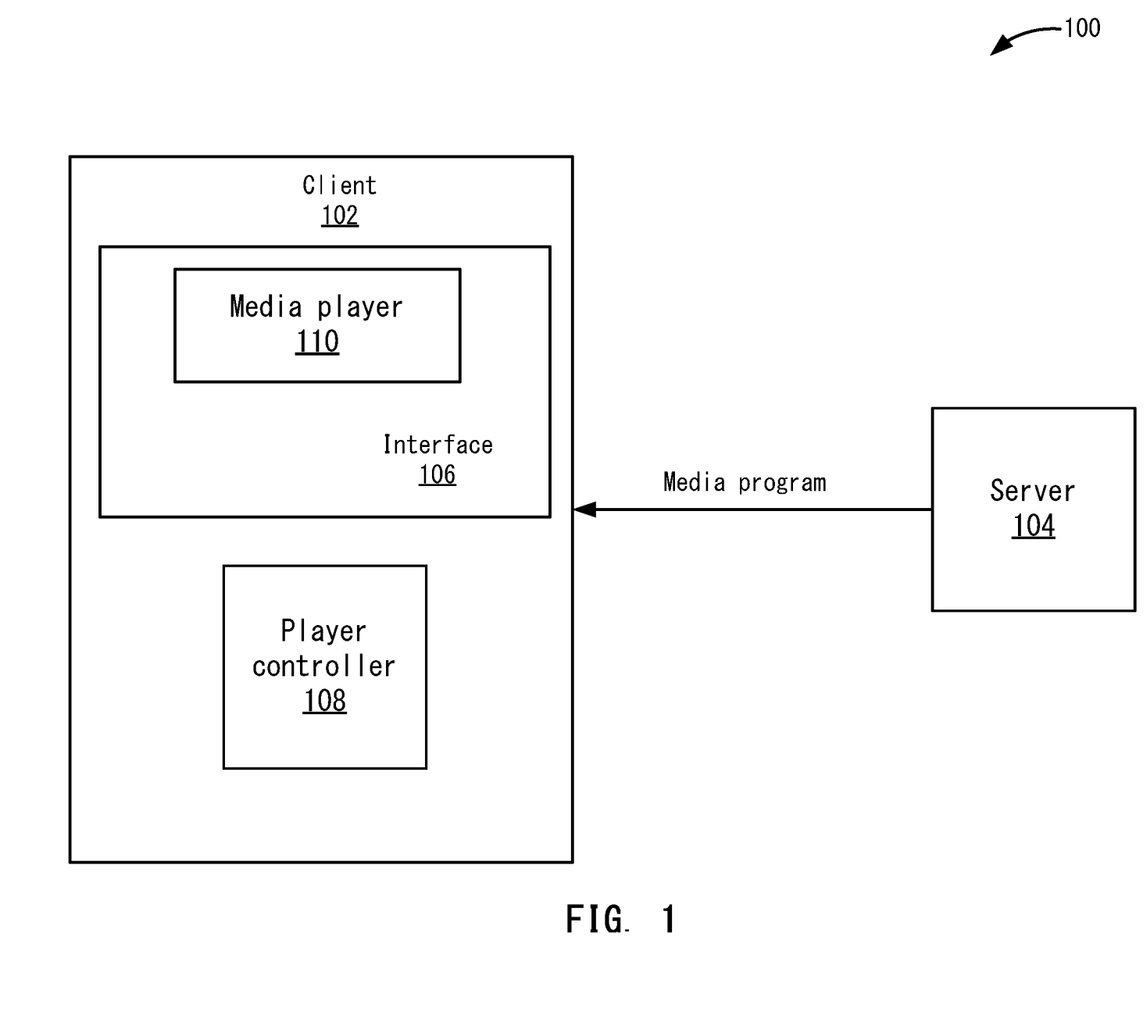
FIG. 1 depicts a simplified system for providing media programs according to one embodiment.

FIG. 1 depicts a simplified system 100 for providing media programs according to one embodiment. System 100 includes any number of clients and servers although only one client 102 and one server 104 are shown. Server 104 may provide media programs to client 102 via a media program delivery service, such as a streaming service. In one embodiment, server 104 may be part of a content delivery service (CDS) that delivers media programs on behalf of the media program delivery service. For example, the media program delivery service may provide a site, page, or application in which users can browse through a library of media programs (e.g., videos, movies, shows, etc.) to play back on client devices. Also, in other embodiments, streaming delivery may not be used and the media player may be used in an offline mode. That is, the video is being played from a storage device accessible to client 102, and not streamed from server 104. The disclosure will reference a "page", which will be understood to include any information that can provide a media player for playing media programs. For example, an application installed on a client 102 may display a page as described below. The media program delivery service will be described in more detail below.

Client 102 may include an interface 106 and a player controller 108. In one embodiment, client 102 may be any type of device that can play media programs, such as laptop computers, mobile phones, smartphones, personal computers, televisions, tablet devices, etc. A more detailed example of client 102 will be described below. Interface 106 may be a user interface that runs an application, such as an installed application or web browser, to display a page, such as a webpage or other document. In one embodiment, the page allows users to browse content, search for content, and play the content, which may include media programs including videos or audio content offered by the media program delivery service. A user may select one of the media programs and server 104 then sends the media program to client 102 for playing in media player 110.

As will be discussed in more detail below, player controller 108 switches between operating modes for media player 110 when certain conditions occur, such as when media player 110 is moved out of bounds. Although player controller 108 is shown in client 102, it will be understood that player controller 108 may be found in server 104 or another device. Due to a user scrolling the page, media player 110 may be moved to an out of bounds position. When the out of bounds position occurs, player controller 108 switches the operating mode of media player 110 such that the media player is moved to a different position on the page so that the player is visible to the user. Also, the operating mode may be a different mode, such as a mode in which the media player cannot be moved even when the user scrolls the page. Although the mode and the position of media player 110 may be switched, both actions may not be performed together. For example, player controller 108 may move the position of media player 110, but not change the mode. In this case, media player 110 may still be playing in the inline mode. The following will describe a structure of a page that allows the scrolling, and then the operating mode switch will be described.

Page Structure

Figure 2:
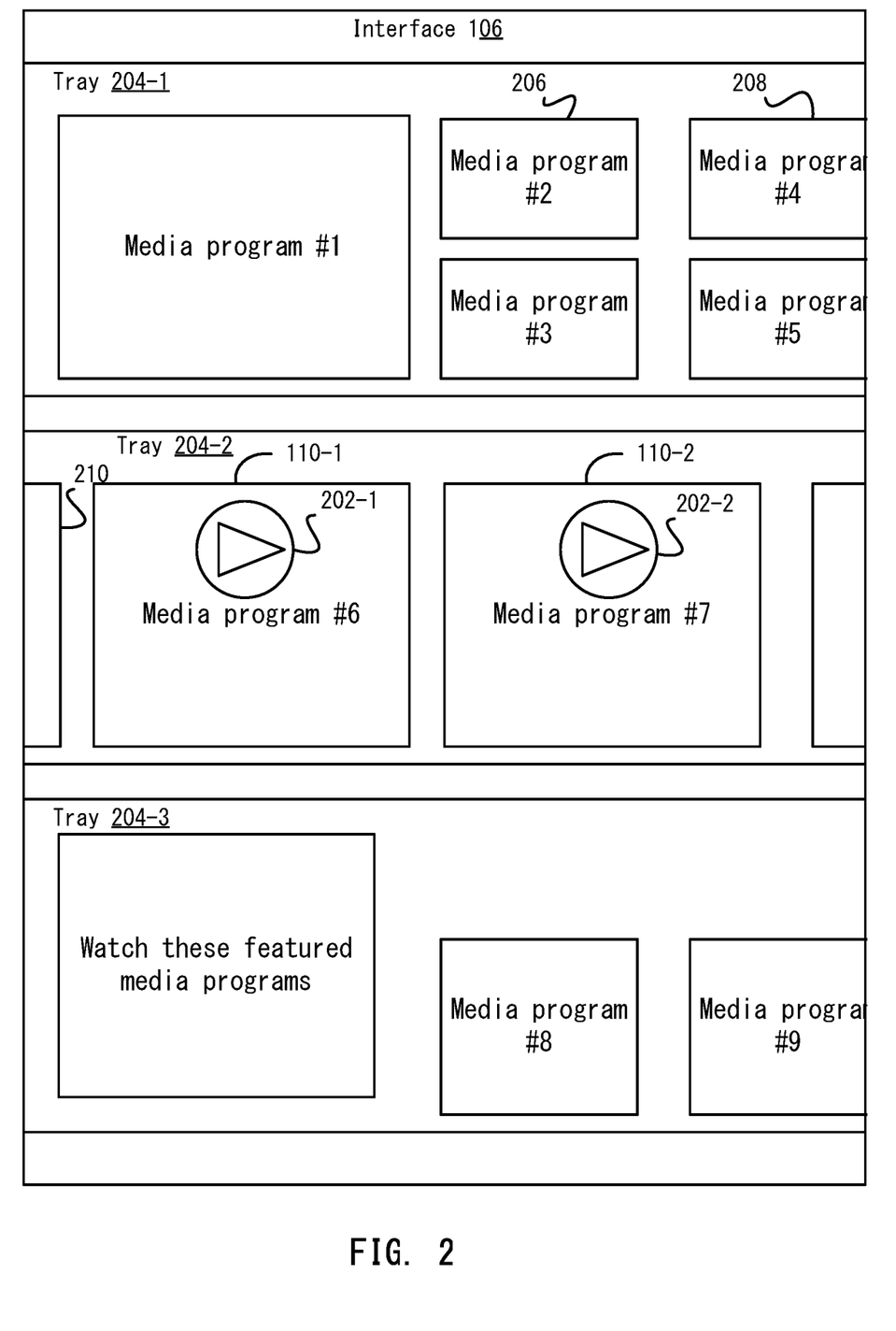
FIG. 2 depicts one example of an interface according to one embodiment.

The page displayed by interface 106 may take many different forms. FIG. 2 depicts one example of interface 106 according to one embodiment. The content may be arranged in different movable portions of the page. In one embodiment, the portions are referred to as trays 204-1-204-3. For example, a tray 204 may show multiple tiles that display information for media programs. Also, trays 204 may be used to organize the media programs into groups, such as dramas, action, new releases, etc.

Each tray can be individually scrolled horizontally (or vertically, or any other direction) to display different tiles. For example, as a user scrolls tray 204-1 to the left, tray 204-1 displays different media programs. In one embodiment, user input from an input device, such as a mouse, touch pad, touch- or pressure-sensitive screen, digitizer, keyboard, remote control, etc., may cause the scrolling. As shown at 208, a media program #4 is partially off-screen of interface 106. When scrolling to the left, the tile including media program #4 may become fully visible. This allows a user to view more media programs in the tray. Other trays 204-2 and 204-3 may also have other partially visible or off-screen tiles that can be displayed upon scrolling. The scrolling may also cause tiles to become not visible. For example, at 210, when tray 204-2 is scrolled to the left, this tile will go off-screen and cannot be viewed. Also, the tile including media player 110-1 may also go partially off-screen or fully off-screen.

Trays 204 may also be individually scrollable. That is, when a tray 204-1 is scrolled, only that specific tray scrolls—the other trays 204-2 and 204-3 remain stationary. In addition to scrolling individual trays 204, a user may scroll a page displaying the trays vertically (or horizontally), which scrolls all of trays 204 in the scrolling direction of the page at once. This scrolling may display additional trays 204 or other content on the page.

Each tile in a tray 204 is a container for displaying information (e.g., an icon or thumbnail) for a media program. A container may also be a place to add a media player. The tiles may allow a user to perform different actions, such as play a media program or display additional information. For example, a user may select a tile at 206 to display the episodes for a TV series. Also, trays 204 may include embedded media players 110. For example, tray 204-2 includes a media player 110-1 and a media player 110-2 that allow a user to play media programs in tray 204-2. In one example, a media player 110-1 allows a user to play a first video and a media player 110-2 allows a user to play a second video. Playing a media program in the tray may be referred to as a first mode of operation or an inline mode. The inline mode plays the media program in the tile while allowing the user to perform other actions within interface 106, such as the user can still browse for other videos, search for different content, share content, etc. while the media program in media player 110 is playing.

When a tile includes a media player 110, the tile may display a thumbnail of the media program or other information with a play button 202 positioned in the tile, such as near the center of the tile. The display of play button 202 may indicate that the playback can start with a selection (e.g., one click) of the tile. In one embodiment, media player 110 is presented as a big tile before playback is triggered. The bigger tile allows playback to start in the same tile and re-sizing of the media player may not performed to playback the media program. In another embodiment, tiles may not be used. For example, the thumbnail image may be included in a container where a short description or tagline of the video is displayed. In this case, the container may be the entire tray 204.

When the tile (e.g., the playback button) is selected, player controller 108 (shown in FIG. 1) may cause media player 110 to play a corresponding media program. For example, if a user selects playback button 212-1, media player 110-1 plays media program #6, and if a user selects playback button 212-2, media player 110-2 plays media program #7. The playback starts at a certain position of the media program, such as at a time corresponding to where the thumbnail is positioned in the video or at the beginning of the media program.

In-Line Operating Mode

Figure 3A:
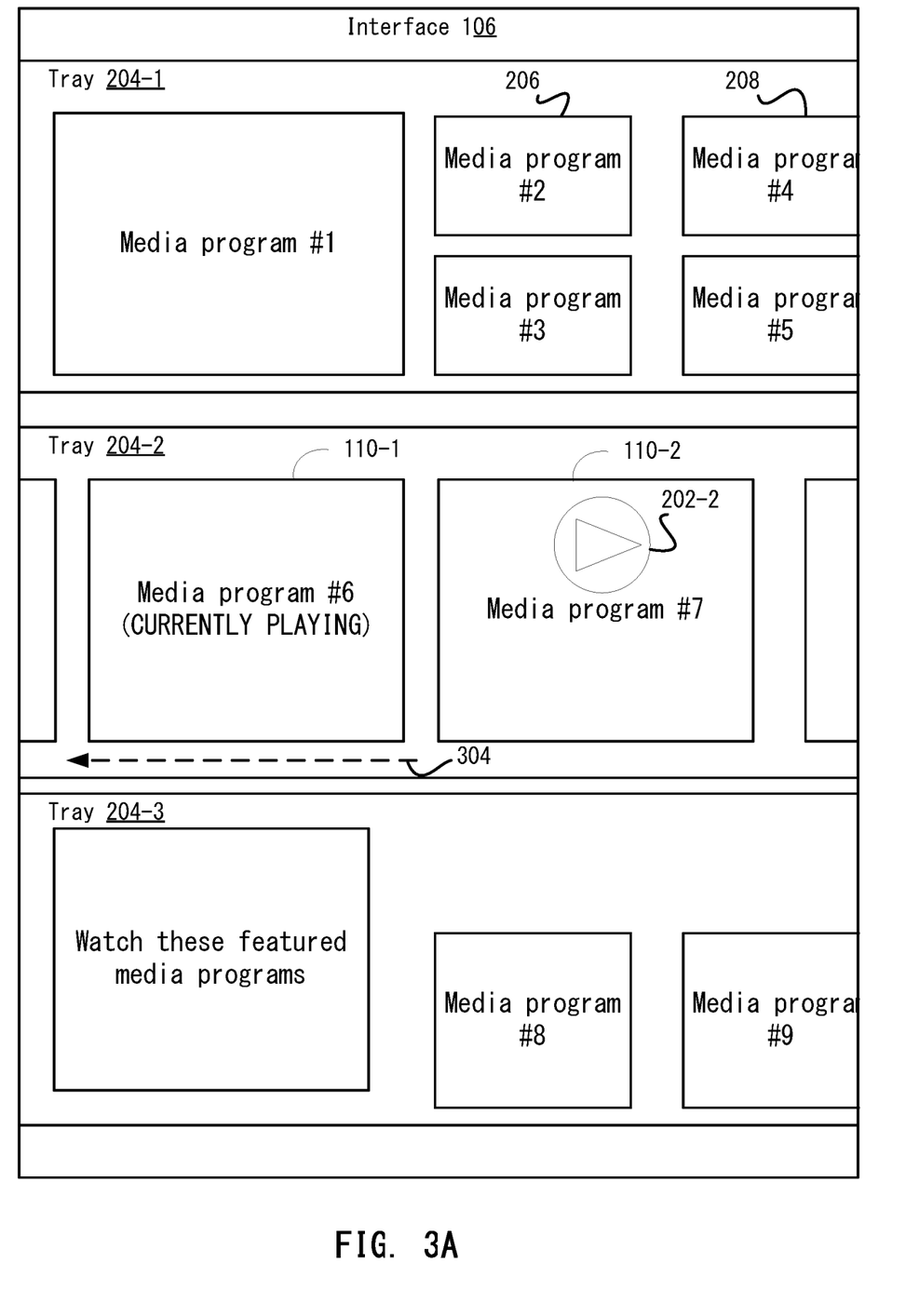
FIG. 3A shows an example of a media player playing in the inline mode according to one embodiment.
Figure 3B:
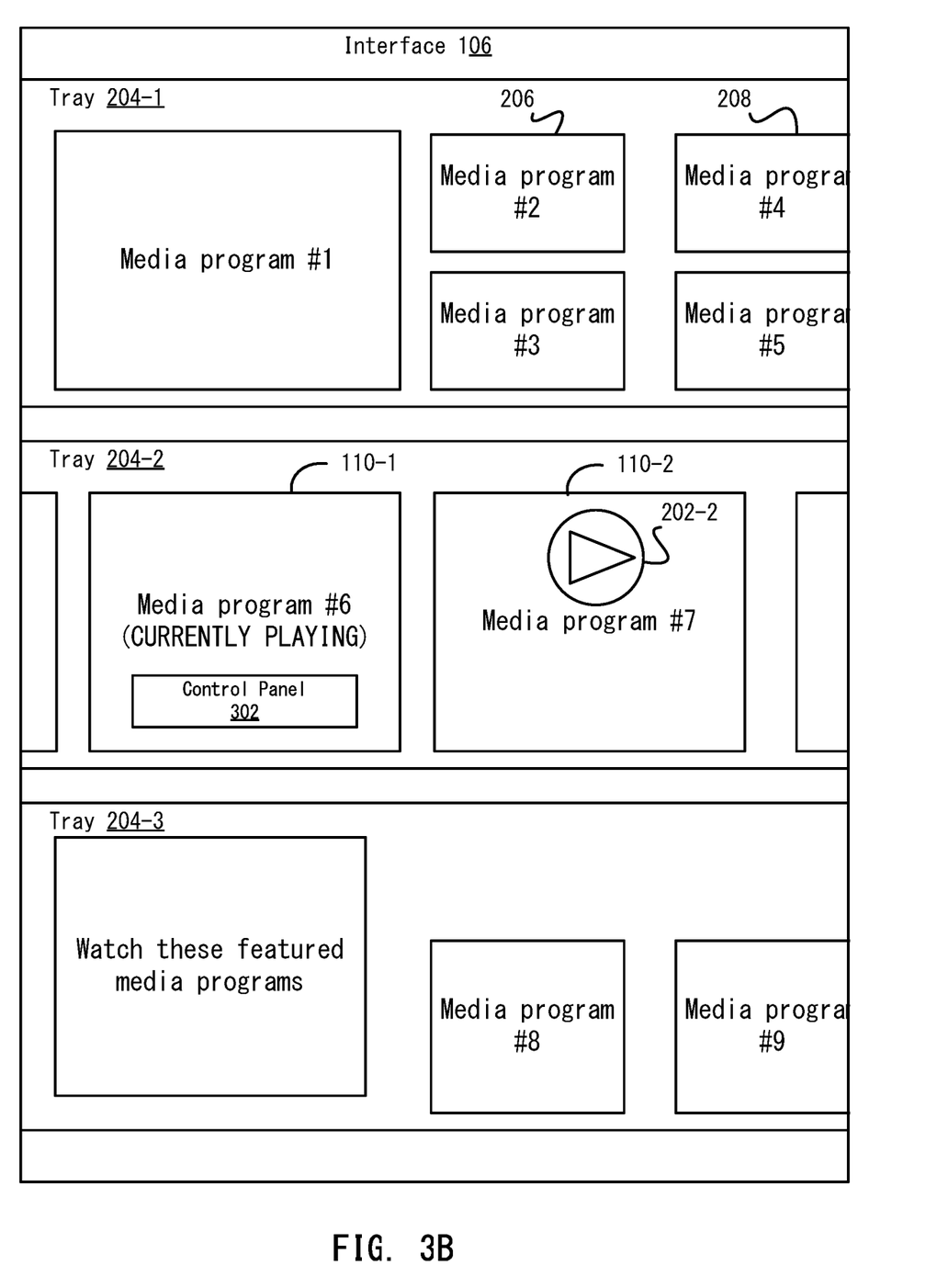
FIG. 3B shows an example of media player that includes a control bar according to one embodiment.

FIG. 3A shows an example of media player 110-1 playing in the inline mode according to one embodiment. The controls to perform trick play functions are hidden. As shown, media player 110-1 is playing in the tile that a user selected that was previously displaying a thumbnail with playback button 202 in FIG. 2. Media player 110-1 was not moved to another position for playback or changed in size. However, in other embodiments, the page may display a slightly larger or smaller media player 110-1 or may move the position slightly. As described above, media player 110-1 is operating in an in-line mode because the media player is still displayed in the tile and will also move when scrolling actions are performed with either tray 204-2 or the entire page. FIG. 3B shows an example of media player 110-1 that includes a control bar 302 according to one embodiment. A limited number of controls are provided due to the size of media player 110-1 in the tile. That is, the amount of space to display media players is restricted and thus a full control panel is not provided.

The playback of the media program continues as the user may perform other actions. For example, the user may scroll trays 204 individually. This may include scrolling different trays from the tray that includes the media player. For example, if media player 110-1 is playing the media program, a user may scroll tray 204-1 to view the tiles of that tray. This does not affect the positioning of tiles in tray 204-2. However, a user may scroll tray 204-2, which moves media player 110-1. For example, an arrow at 304 shows that tray 204-2 is being moved to the left, which also moves media player 110-1 to the left. Another way of moving the page is for a user to scroll the entire page, which moves all of trays 204-1-204-3 (and media player 110-1) at once.

As discussed above, because media player 110-1 can move, a user may move media player 110-1 to an undesirable position, such as out of bounds. Being out of bounds may be when media player 110-1 is partially or fully off screen or may be a position in interface where the visibility is occluded for a user (e.g., moved behind an object overlaid on the page, too far to the bottom of the page, etc.). In the page shown in FIG. 3A, a user may move media player 110-2 out of bounds to the left or right by scrolling tray 204-2 or out of bounds on the top or bottom of the page by scrolling the page. In one example shown at 304, the user may move tray 204-2 horizontally to the left. This may cause media player 110-1 to move to an off-screen position. For example, a portion of media player 110-1 may go off-screen or the entire media player 110-1 may be moved off-screen. In other examples, media player 110-1 may be moved behind any object on the page such that media player 110-1 is occluded from view of the user. When the out of bounds condition occurs, player controller 108 transitions media player 110-1 to the docked mode.

Docked Operating Mode

When media player 110-1 is moved to an out of bounds position, player controller 108 may switch media player 110 between different modes of operation. For example, player controller 108 may switch from playing media player 110-1 in the inline mode to another mode, such as a docked mode.

The docked mode is where a docked media player 110-1 is unable to move, e.g., the media player 110-1 is docked in a position of the interface 106. One purpose of transitioning to the docked mode is to move media player 110-1 to a mode that will fully display media player 110-1 in interface 106. Also, transitioning to the docked mode recognizes that the user is browsing the page and may not fully be concentrating solely on watching the media program. The docked mode allows the user to browse the page without being concerned with moving media player 110 out of bounds. Other modes may also visibly display media player 110-1. For example, instead of the docked mode, the application may display media player 110-1 in another tile or tray that in currently visible in interface 100. Further, the application may overlay media player 110-1 in the visible area of interface 100, pop up another window, or open another page with media player 110-1. In one embodiment, all of the different modes move the position of media player 110-1 into a fully visible position.

When a user navigates the page, the docked mode is a mode in which media player 110-1 does not move based on a user's navigation of the page. For example, a user may continue to scroll tray 204-2 horizontally. When this occurs, media player 110-1 is docked at a position of the page and remains stationary. Further, when the user may scroll the page vertically up or down, this moves trays 204 to different positions on the page vertically, but media player 110-1 does not move with the scrolling of the page in the docked mode. In this way, media player 110-1 is stationary and will always be displayed no matter what scrolling a user performs on the page. In other embodiments, media player 110-1 may be allowed to move in the docked mode, but player controller 108 may put additional restrictions on the movement, such as media player 110-1 cannot be moved out of bounds.

In one embodiment, player controller 108 determines when tiles move to an out of bounds position. When this occurs, the tile is detached from the tray and player controller 108 transitions media player 110 to the docked mode. Also, player controller 108 may continuously calculate a position of media player 110-1, and determine when the position is considered out of bounds. In addition to transitioning between modes automatically, whether in inline mode or docked mode, interface 104 may receive an input (e.g., a gesture) that may cause player controller 108 to transition media player 110-1 to another mode. For example, player controller 108 may transition media player 110-1 from the inline mode to the docked mode based on a pinching or swipe gesture. Also, player controller 108 may transition media player 110-1 back to a previous mode, such as from the docked mode to the inline mode, or vice versa. Further, player controller 108 may transition media player 110-1 to a third mode, such as a full screen mode. The full screen mode is where media player 110-1 is displayed in a full screen in which the user can only watch the video at this point using interface 104. In one embodiment, the gesture may be a zoom out gesture. In another embodiment, an explicit button inside media player 110-1 may convert the player to the full screen mode, to the docked mode, or back to the previous mode.

Figure 4:
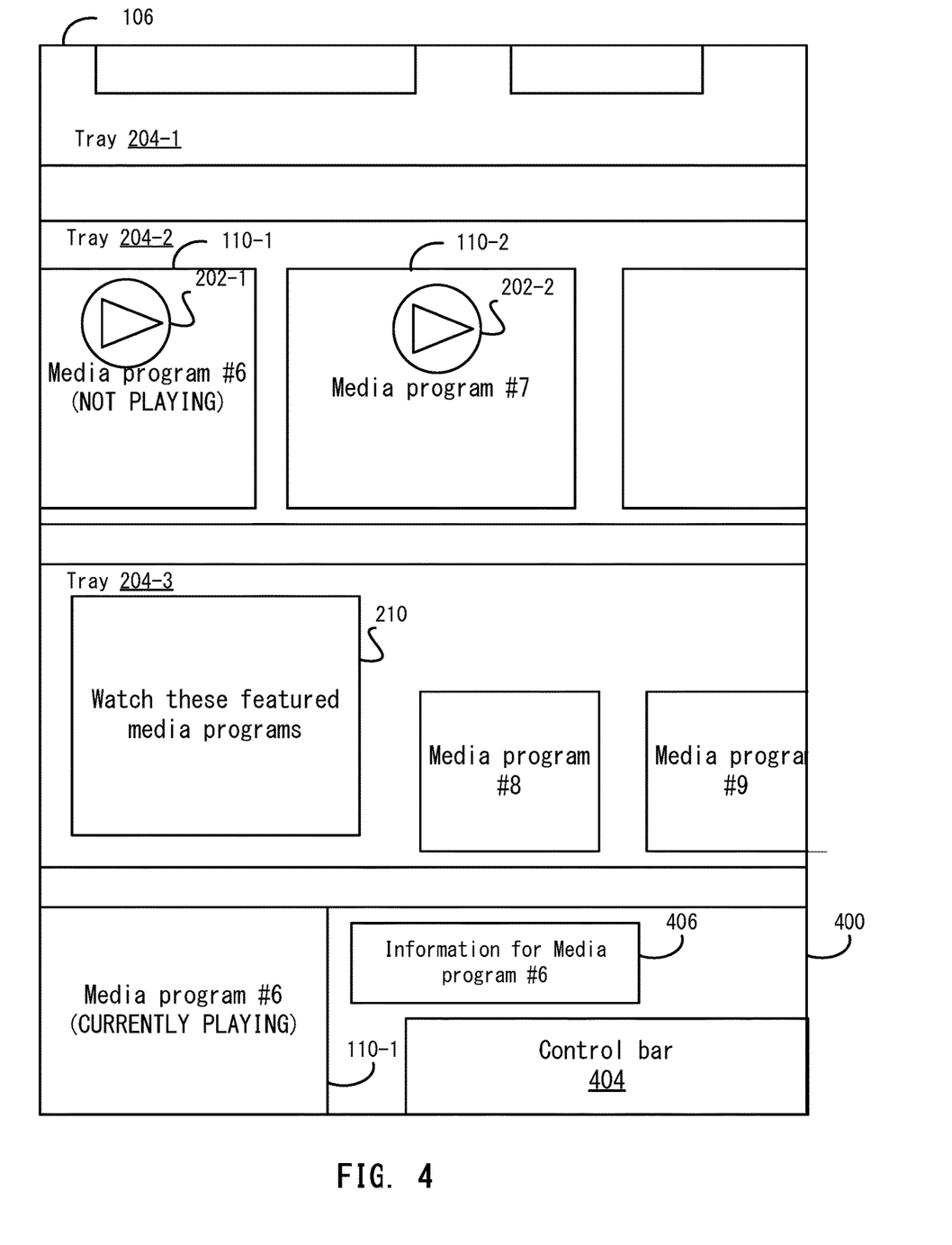
FIG. 4 shows an example of a media player playing in the docked mode in a container according to one embodiment.

FIG. 4 shows an example of a media player 110-1 playing in the docked mode in a container 400 according to one embodiment. In the docked mode, media player 110-1 may have a larger control bar shown at 404 from that shown in FIG. 3B when media player 110-1 was operating in the inline mode. The larger control bar includes more functionality with additional controls than the controls provided in inline mode. For example, the controls may include play, pause, rewind, scrub, share, etc. An additional area 406 may show more information about the media program than the information shown in inline mode, such as the title, description, or captions. The larger control bar and additional information is possible due to media player 110-1 being placed into a larger container 400 than the previous tile. However, the size of media player 110-1 in the docked mode may vary. For example, media player 110-1 may only be playing in a tile in container 400. However, this tile may be docked or not moveable.

Interface 104 may show the change from the inline mode to the docked mode by an animation transferring media player 110-1 to container 400. For example, the player controller 108 opens a new container 400 in interface 104. Then, player controller 108 transfers media player 110-1 to the new container 400. In lieu of an animation, player controller 108 may perform the transfer immediately without animation.

Media player 110-1 continues to play the media program in the docked mode. For example, the media program may continue to play at a corresponding point in the media program from when the transition started. Also, the tile in tray 204-2 may stop playing the media program. In this case, the tile may revert back to the state before media player 110-1 was playing the media program in the inline state. For example, the tile redisplays the playback button 212-1 to indicate playback could be started in the tile. Also, player controller 108 may have caused the page to shift upward as shown in FIG. 4 to accommodate the placing of container 400 in the page. As shown, tray 204-1 is only partially visible. However, in other embodiments, player controller 108 may not shift the page upward and may overlay container 400 over part of the page.

Player Controller

Figure 5:
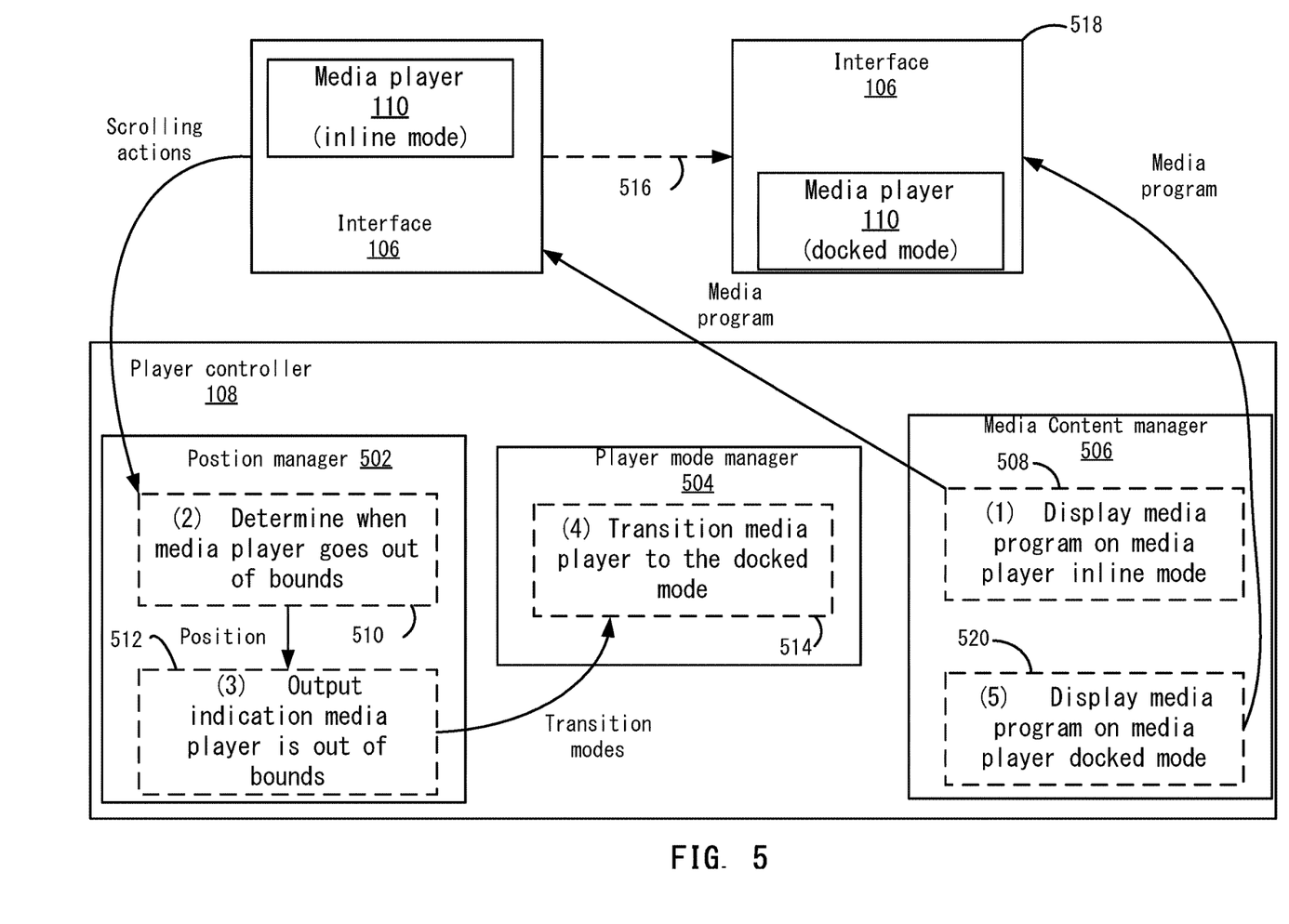
FIG. 5 depicts a more detailed example of a player controller in the client according to one embodiment.

FIG. 5 depicts a more detailed example of player controller in client 102 according to one embodiment. Player controller 108 includes a position manager 502, a player mode manager 504, and a media content manager 506.

In a step 1 (reference numeral 508), manager 506 receives the media program from a content server. Media player 110 then displays the media program in the inline mode. Media player 110 continues to play the media program in the inline mode until a mode transition occurs or playback is stopped.

In a step 2 (reference numeral 510), position manager 502 determines when media player 110 goes out of bounds. Position manager 110 may make this determination in different ways. For example, position manager 502 may calculate a position of media player 110, which is actively playing the media program. Position manager 502 uses the position to determine when media player 110 goes out of bounds. In other embodiments, position manager 502 may determine which tiles go out of bounds. To detect when media player 110 goes out of bounds, position manager 502 may receive scrolling actions to calculate the position of media player 110. For example, position manager 502 receives scrolling actions from interface 104. In this case, the user may be scrolling different trays horizontally or scrolling the page vertically. As discussed above, one of the trays includes the media player 110 that is currently playing a video. To determine when media player 110 is out of bounds, position manager 502 may determine an original position of media player 110 when play of the media program in the media player is activated. Then, as position manager 502 receives the different scrolling actions, player controller 108 calculates the new position of media player 110. For example, when a scrolling action to the left occurs, position manager 502 calculates where media player 110 has moved and updates the current position of media player 110. Also, position manager 502 may be determining which tiles go out of bounds to determine which tiles should be displayed in trays 204. For example, as a user scrolls tray 204, position manager 110 detects when different tiles are detached from trays 204 (e.g., the tiles are not displayed) as the tiles go out of bounds.

Position manager 502 may continuous evaluate whether media player 110 goes out of bounds. For example, position manager 502 compares the position to a threshold or out of bounds coordinates to determine if media player 110 goes out of bounds. The threshold may be different, such as only a small part of media player 110 may have to go out of bounds, half of media player 110, or the entire media player. For discussion purposes, media player 110 has gone out of bounds because the user has moved tray 204-1 to the left such that media player 110 is partially off-screen (e.g., not displayed in the visible area of interface 106) and position manager 502 detects this occurrence.

In a step 3 (reference numeral 512), position manager 502 outputs an indication that media player 110 has gone out of bounds. When position manager 502 outputs the out of bounds indication, in a step 4 (reference numeral 514), player mode manager 504 transitions media player 110 to another mode, such as a docked mode. For example, as shown in a transition at 516, interface 106 now displays media player 110 in the docked mode at 518. Further, player mode manager 504 has moved media player 110 to another position in interface 106.

In addition to transitioning media player 110 to a different mode, media player 110 continues to play the media program in media player 110. Before the mode switch, media content manager 506 displays segments of the media program that are received from the content server in media player 110 in the inline mode. However, when media player 110 is transferred, in a step 5 (reference numeral 520), media content manager 506 receives the next segments of the media program to display, and media content manager 506 displays the segments in media player 110 in the docked mode. In one embodiment, media player 110 is the same media player operating in the same session, and media content manager 506 can continue to play the media program no matter where the media player is positioned and irrespective of the operating mode. In other embodiments, if a new media player is created, media content manager 506 can start playing the media program at a similar time that the media program stopped playing in the previous mode. Other methods for playing the media program in different modes will be appreciated.

Flowcharts and Example Code

Figure 6:
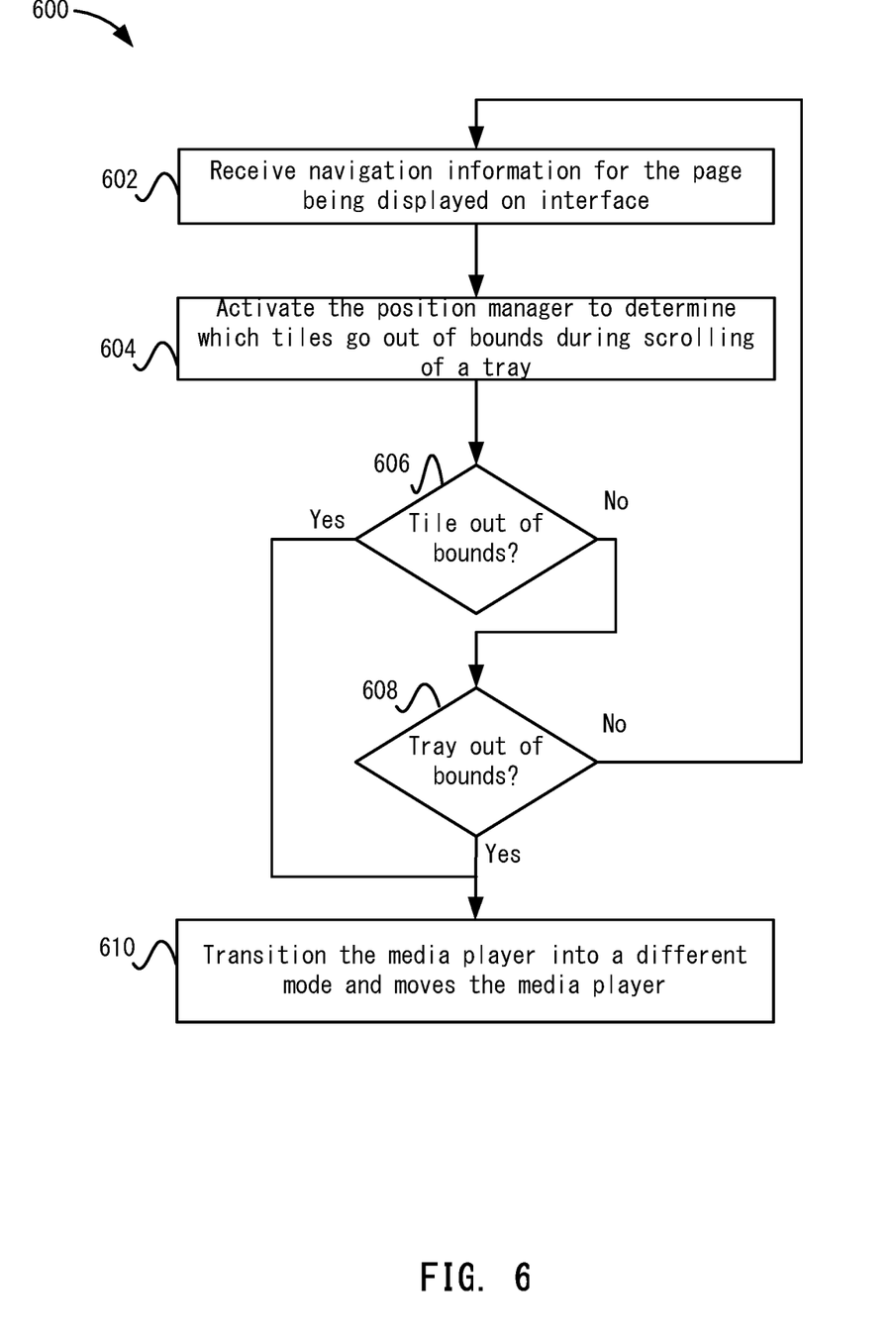
FIG. 6 depicts a simplified flowchart of a method for controlling the media player according to one embodiment.

FIG. 6 depicts a simplified flowchart 600 of a method for controlling media player 110 according to one embodiment. At 602, player controller 108 receives navigation information for the page being displayed on interface 106. Navigation information includes scrolling actions for the user.

As discussed above, media player 110 may go out of bounds from scrolling trays 204 or a page. For the scrolling of trays 204, at 604, player controller 108 activates position manager 502 to determine which tiles go out of bounds during scrolling of a tray 204. For example, position manager 502 detects which tiles go off screen and detaches those tiles from the current view in trays 204. Also, position manager 502 detects which tiles come on screen and are activated in trays 204.

At 606, position manager 502 determines if a tile including media player 110 that is playing in the inline mode has been detached from tray 204. For example, media player 110 may go out of bounds. If media player 110 is still in-bounds, the process continues to 608.

When media player 110 is detached, at 610, player mode manager 504 transitions media player 110 into a different mode and moves the media player. For example, player mode manager 504 transitions media player 110 to a docked mode at the bottom of the page.

In addition to tiles being detached, trays 204 may go out of bounds. In this case, at 608, position manager 502 determines if a tray including media player 110 that is playing in the inline mode has been moved out of bounds. For example, tray 204 may go off screen from scrolling the page. If media player 110 is still in-bounds, the process reiterates to 602 to determine further navigation actions.

When a tray 204 with a media player 110 playing in inline mode goes out of bounds, at 610, player mode manager 504 transitions media player 110 into a different mode and moves the media player. For example, player mode manager 504 transitions media player 110 to a docked mode at the bottom of the page.

Accordingly, particular embodiments allow a user to play a media program inline in a tray while allowing the user to continue to browse the page. While scrolling, the user may intentionally or accidentally move the inline player out of bounds. In this case, to allow the user to continue to watch the media program The following shows code implementing an embodiment:

---

For steps 602 and 604 above:

```
// This method is triggered whenever user scrolls the scroll view,
and calculates which views are still within the visible area,
and
detaches the views that go out of bound, and re-attaches the
views that go into the bound.
void scrollViewDidScroll {
  for (subview in self.views) {
    if (RectanglesOverlap(subview.frame, self.bounds)) {
      self.addSubview(subview);
    }
    else {
```

-continued

For steps 602 and 604 above:

```
        subview.removeFromSuperview( );
    }
  }
}
```

For step 606:

```
// This method makes sure that if the inline player's tile is
detached from the scroll view, the play mode changes and
player moves void removeFromSuperview( ) {
  if (self.isPlaying) {
      PlayerController.changePlayerModeTo(bottomPanelMode);
  }
  super removeFromSuperview( );
}
```

For step 608:

```
// This method makes sure that if the whole tray is moved out
of bound (e.g. user scrolls vertically to move the tray out), the
play mode changes void
removeFromSuperview( ) {
  for (tile in self.scrollView.views) {
      if ((tile is PlayableTile) && tile.isPlaying) {
          PlayerController.changePlayerModeTo(bottomPanelMode);
          break;
      }
  }
}
```

For step 610:

```
// This method performs the transition between modes
void changePlayerModeTo(newMode) {
  currentPlayer = self.getCurrentPlayer( );
  oldContainer = currentPlayer.container;
  newContainer = nil;
  if (newMode == FullScreen) {
    newContainer = createFullScreenContainer( );
  }
  else if (newMode == BottomPanelMode) {
    newContainer = createBottomPanelPlayerContainer(
  );
  }
  else if (newMode == InlineMode) {
    newContainer = getLastInlinePlaybackTile( );
  }
  currentPlayer.frame = newContainer.playerFrame;
  currentPlayer.container = newContainer;
  newContainer.addSubview(currentPlayer);
}
```

System Overview

Figure 7:
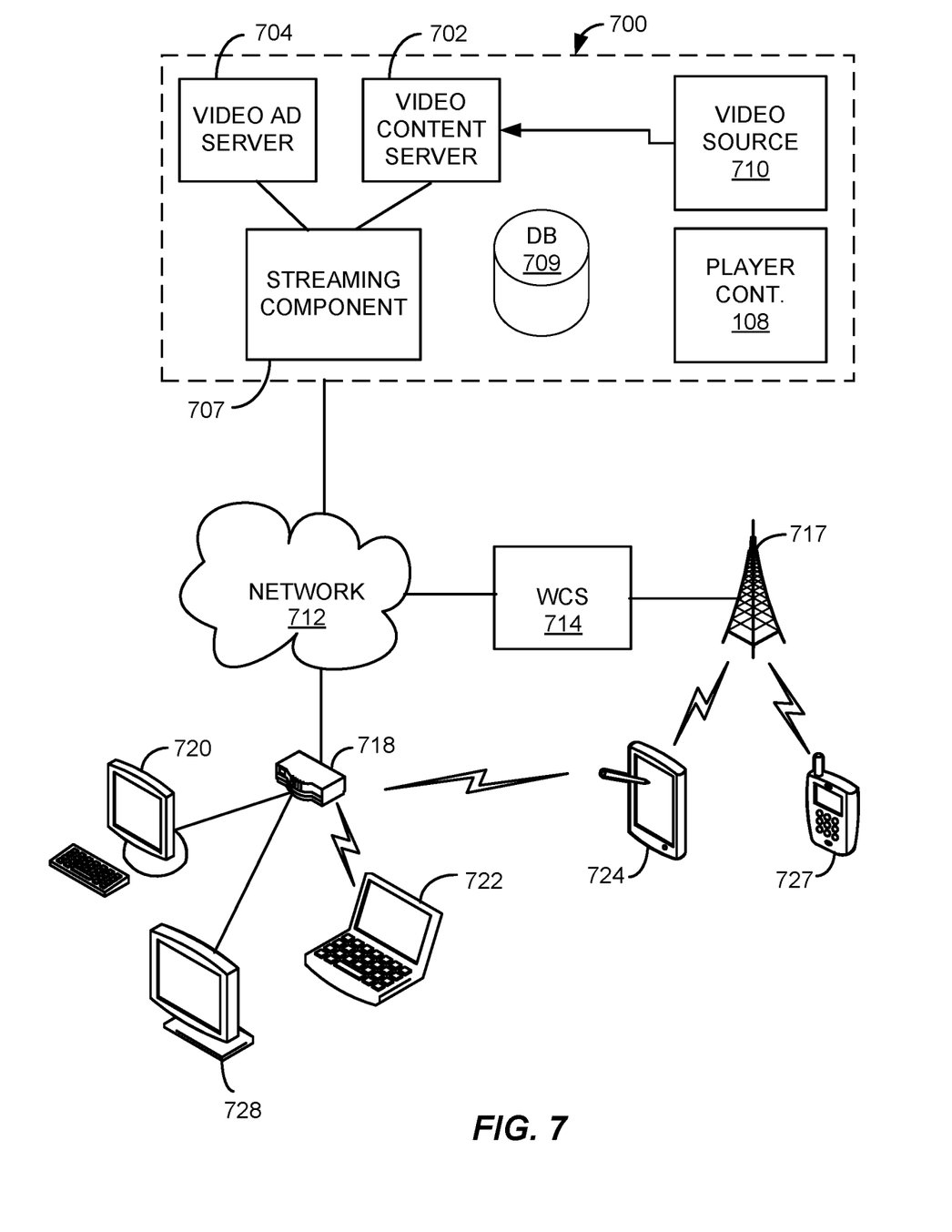
FIG. 7 shows a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include player controller 108. In this case player controller 108 is found on the server side or may communicate with a player controller 108 in the client.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712 and/or other network 714. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 716 for a wireless telephony network 714, or via some other connection. In operation, such client devices 720 may send and receive data or instructions to the system 600, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
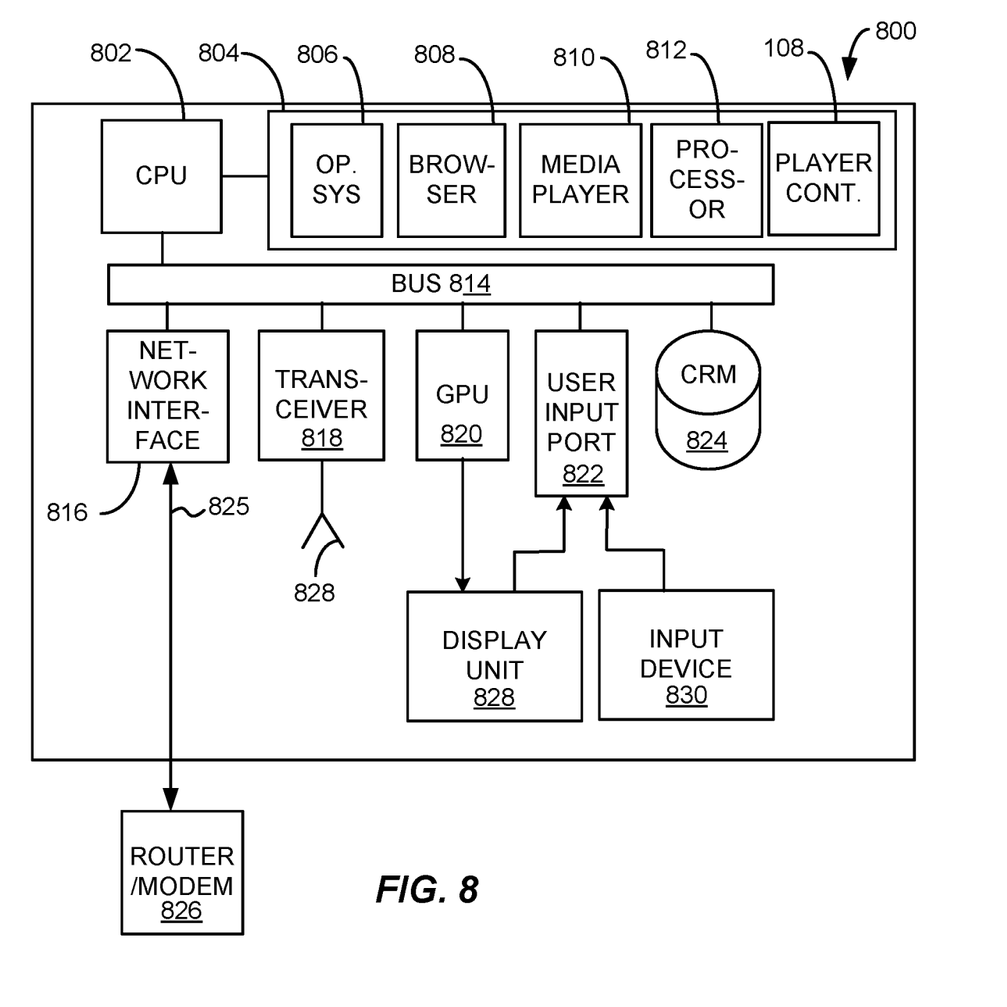
FIG. 8 show a diagrammatic view of an apparatus for processing video content to operate a media player in different modes according to one embodiment.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include player controller 108. Player controller 108 may operate independently or communicate with a player controller 108 on the server side. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 828, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 800 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    displaying, by a computing device on an interface, a portion of the interface in a first state that allows playback of a media program;
    playing, by the computing device on the interface, the media program in a media player that is operating in a first mode in which the media player is embedded in a portion of the interface, wherein the media player in the portion of the interface is moveable;
    detecting, by the computing device, a change in a condition for the media player;
    switching, by the computing device, from the first mode to a second mode based on the change in the condition, wherein the second mode restricts movement of the media player;
    changing, by the computing device, a position of the media player from a first position to a second position upon switching to the second mode, the media player continuing to play the media program in the second position; and
    reverting, by the computing device, the portion of the interface to the first state that allows playback of the media program while the media player continues to play the media program in the second position.

2. The method of claim 1, wherein changing the position of the media player comprises:
    moving the media player from the first position of an out of bounds position where a portion of the media player is not visible on the interface to the second position where the portion is visible on the interface.

3. The method of claim 1, wherein changing the position of the media player comprises:
    moving the media player from the first position above a bottom panel of the interface to the second position at the bottom panel of the interface.

4. The method of claim 1, wherein after changing position to the second position, the media player does not move when the portion of the interface is scrolled.

5. The method of claim 1, wherein the second mode is a docked mode where the media player does not move based on a user's navigation of a page displayed on the interface.

6. The method of claim 1, wherein detecting the change in the condition for the media player comprises:
    detecting an input that causes the change in the condition.

7. The method of claim 6, wherein detecting the input comprises:
    receiving a gesture that is received on the interface.

8. The method of claim 6, wherein the input is received at a button on the interface.

9. The method of claim 1, further comprising:
detecting another change in the condition for the media player;
switching from the second mode to the first mode based on the change in the condition; and
moving the media player from the second position to the first position, the media player continuing to play the media program in the first position.

10. The method of claim 1, further comprising:
detecting another change in the condition for the media player;
switching from the second mode to a third mode or the first mode to the third mode based on the change in the condition; and
moving the media player from the second position to a third position or the first position to the third position, the media player continuing to play the media program in the first position.

11. The method of claim 10, wherein the third position is a full screen view in the interface.

12. The method of claim 1, wherein changing the position of the media player comprises:
opening a new container for the media player; and
moving the media player to the new container.

13. The method of claim 1, wherein a size of the media player is changed when the media player is moved.

14. The method of claim 1, wherein changing the position of the media player comprises:
changing the position of the media player to a corner of the interface.

15. A non-transitory computer-readable storage medium containing instructions, that when executed, control a computer system to be configured for:
displaying, on an interface, a portion of the interface in a first state that allows playback of a media program;
playing, on the interface, the media program in a media player that is operating in a first mode in which the media player is embedded in a portion of the interface, wherein the media player in the portion of the interface is moveable;
detecting a change in a condition for the media player;
switching from the first mode to a second mode based on the change in the condition, wherein the second mode restricts movement of the media player;
changing a position of the media player from a first position to a second position upon switching to the second mode, the media player continuing to play the media program in the second position; and
reverting the portion of the interface to the first state that allows playback of the media program while the media player continues to play the media program in the second position.

16. The non-transitory computer-readable storage medium of claim 13, wherein changing the position of the media player comprises:
moving the media player from the first position of an out of bounds position where a portion of the media player is not visible on the interface to the second position where the portion is visible on the interface.

17. The non-transitory computer-readable storage medium of claim 16, wherein changing the position of the media player comprises:
moving the media player from the first position above a bottom panel of the interface to the second position at the bottom panel of the interface.

18. A method comprising:
displaying, by a computing device on an interface, a portion of the interface in a first state that allows playback of a media program;
playing, by the computing device on the interface, the media program in a media player operating in a first mode in which the media player is embedded in a portion of the interface, wherein the media player in the portion of the interface is moveable;
detecting, by the computing device, a change in a condition for the media player;
selecting, by the computing device, between switching from the first mode to a second mode or a third mode based on the change in the condition;
when the second mode is selected:
changing, by the computing device, a position of the media player from a first position to a second position on the interface; and
reverting, by the computing device, the portion of the interface to the first state that allows playback of the media program while the media player continues to play the media program in the second position; and
when the third mode is selected, changing, by the computing device, the position of the media player from the first position to a full screen view.

19. The method of claim 18, wherein detecting the change in the condition for the media player comprises:
detecting an input that causes the change in the condition.

20. The method of claim 18, further comprising:
detecting another change in the condition for the media player;
when the media player is operating in the second mode, switching from the second mode to the first mode or the third mode based on the change in the condition; and
when the media player is operating in the third mode, switching from the third mode to the first mode or the second mode based on the change in the condition.

* * * * *